(12) United States Patent
Hait

(10) Patent No.: US 6,477,287 B1
(45) Date of Patent: Nov. 5, 2002

(54) POLARIZATION-PRESERVING, PHASE-AND-POLARIZATION-INSENSITIVE, PHOTONIC DATA ROUTER

(76) Inventor: John N. Hait, 10776 Portobelo Dr., San Diego, CA (US) 92124

( * ) Notice: Subject to any disclaimer, the term of this patent is extended or adjusted under 35 U.S.C. 154(b) by 24 days.

(21) Appl. No.: 09/678,859

(22) Filed: Oct. 2, 2000

(51) Int. Cl.[7] .............................. G02B 6/26; H04J 14/00
(52) U.S. Cl. .............................. 385/15; 385/14; 385/16; 385/39; 359/117
(58) Field of Search .............................. 385/15, 16, 14, 385/39; 359/117, 127, 156, 251

(56) References Cited

U.S. PATENT DOCUMENTS

| | | | |
|---|---|---|---|
| 4,474,435 A | 10/1984 | Carlsen et al. | 359/320 |
| 5,093,802 A | 3/1992 | Hait | 708/80 |
| 5,317,658 A | 5/1994 | Bergland et al. | 385/16 |
| 5,867,291 A | 2/1999 | Wu et al. | 359/127 |
| 5,912,748 A | 6/1999 | Wu et al. | 359/117 |
| 5,970,188 A | * 10/1999 | Pelz, Jr. et al. | 385/27 |
| 5,978,116 A | 11/1999 | Wu et al. | 359/124 |

OTHER PUBLICATIONS

Fiberoptic Product News, Jul. 2000 by Cindana A. Turkette and Mark K. Barnard of SpectraSwitch, Inc. regarding WDM.

* cited by examiner

Primary Examiner—Georgia Epps
Assistant Examiner—M. Hasan
(74) Attorney, Agent, or Firm—Gary L. Eastman

(57) ABSTRACT

A polarization insensitive photonic information router that can use polarization sensitive switches is disclosed. A photonic input signal is polarization separated into two paths having mutually orthogonal fixed polarizations and complementary amplitude fluctuations in accordance with polarization fluctuations of the input signal. Duplicate-acting switches, one for each fixed polarization, produce switched, polarized signal pairs. These are connected so as to recombine energy from both polarization contributions in each of the switched outputs. Recombining can standardize output polarizations, or reproduce the input polarization fluctuations. Polarization stabilization can also be used before switching. Decoding packet data to operate the switch produces a polarization insensitive packet switching router.

12 Claims, 7 Drawing Sheets

POLARIZATION-PRESERVING, PHASE-AND-POLARIZATION-INSENSITIVE, PHOTONIC DATA ROUTER

BACKGROUND

1. The Field of the Invention

This invention relates to photonic processing and, more particularly, to novel systems and methods for switching and routing photonic signals.

2. Background

Communication signals must be routed through networks from a source to a destination. One form of signal is a photonic signal. Photonic signals may be a series of pulses, or other serial data, and may also be carried in a two dimensional array of pixels, a parallel flow of data.

Fundamental to transmission of any signal over a multiplicity of locations, such as through elements of a network, is routing and switching of signals between potential alternative paths. Photonic signals are electromagnetic waves modulated in some fashion to carry information. Electronic signals are typically routed by electronic switches. Optical signals or photonic signals are typically switched by electro-optical mechanisms. Switches for optical signals or photonic signals do not work well with signals that have variations in state of polarization. For example if polarization is modulated as a mechanism for transmitting information in a photonic signal, the variations in polarization must pass through all elements of a switching or routing network in order to preserve the information embodied in the switched outputs.

Various signal routers have been produced. Particular technologies include micro-mirrors, bubble-jet bubbles, and electronic switches or electro-optical mechanisms. The prior art lacks an effective high speed switching structure for routing a photonic signal through basic switching elements of a network while preserving or stabilizing a state of polarization of the photonic signal. If polarization-sensitive elements exist, including elements that benefit from polarization modulation, then preservation or stabilization of the state of polarization of a photonic signal may be critical.

Switches for routing optical or photonic data have made recent advances. For example, Bergland et al., U.S. Pat. No. 5,317,658, characterize an optical switch as "Polarization independent." According to Bergland, certain specific difficulties associated with polarization dependence are addressed by a switch capable of switching both TE and TM components of a lightwave received by a switch.

However, Bergland et al. state that "Although the polarization-independent switch may switch both the TE and TM components of a light wave in an arbitrary polarized condition, it has the disadvantage of requiring a higher operating voltage than the polarization-dependent photonic switch. Moreover, the level of performance in each individual switch element in the polarization-independent photonic switch is inferior to that of the individual switch elements in the polarization-dependent photonic switch." The requirement for using this type of photonic switch inherently limits the usefulness and switching speed.

Another problem is dependence on high birefringence fiber as a required component. Bergland teaches the necessity of using this fiber in order to provide the polarization rotation needed to accommodate his polarization-dependent switches. This requirement introduces specific problems that may not be observed with the older, slower communications equipment, but as bit rates go up, and throughput becomes more important, the signals being switched become more critical. High time division multiplexed (TDM) bit rates require shorter and shorter pulses. These pulses may require special processing both before they are launched into the fiber, and at the various nodes along the way.

A "high birefringence fiber" is a nonlinear optical element. The introduction of such nonlinearity can be a severe detriment in high bit rates systems because it tends to exacerbate the problems of four-wave mixing between the various optical signals, that might otherwise be manageable.

Every extra element inserted into an optical path introduces losses. So, by providing an optical switch that does not require these extra components, losses can be reduced, which becomes increasingly important as the number of switching elements in a switching fabric increases.

The present invention addresses these disadvantages by producing a photonic switch that does not favor one polarization over another. It eliminates the need both for the high birefringence fiber, and even for the need to rotate the polarization in one of the light paths, simplifying the design, reducing losses, and reducing manufacturing costs. The present invention goes on to provide high speed switching even when using low speed components. It introduces the use of optically-controlled, all optical switching, plus a simplified routing arrangement that is compatible with photonic transistor technology and other all optical methods of directing data packets through all optical switching fabrics.

Carlsen et al, U.S. Pat. No. 4,474,435 also rotates one of the polarization-separated beams in order to use a "polarization sensitive interferometric multimode fiber optic switch and modulator." It suffers from the same kinds of difficulties as Bergland. Additionally, Carlsen uses expensive specially made crystals.

Transparency is a very important consideration in the design of photonic communications equipment, and photonic signal switching matrices use in optical computers and the like. In order to provide reliable, high speed, practical switching all aspects of an incoming signal must be effectively transmitted through the switch and into the output. In order to prevent the introduction of noise, and as a result, produce unfavorable bit error rates, all phase, frequency, amplitude, spatial and polarization variations of the original input signal must be reliably transmitted through the switch and into the output.

In other words, a router must be transparent, switching an entire wavefront, not just binary data. When free space optics are used, even beam quality and profile becomes important when interconnecting a number of switches into a matrix or network. Full images with their massive amounts of spatial information also need to be switched. The prior art does not address these issues.

BRIEF SUMMARY AND OBJECTS OF THE INVENTION

In view of the foregoing, it is a primary object of the present invention to provide a polarization-preserved or alternatively polarization-stabilized router for photonic signals.

It is another object of the invention to provide a phase-preserving, and phase-and-polarization-preserving router for photonic signals.

One object of the present invention is to provide means and method of transparent switching of photonic signals including all their aspects and information content as represented by a series of wavefronts along with their temporal waveforms.

Another object is to provide means and method of switching and routing images based on their temporal and/or spatial content.

It is a further object of the invention to provide a photonic switching mechanism capable of switching entire arrays of pixels maintained in a coherent pattern. Accordingly, it is an object of the invention to transmit and switch photonic images. It is yet another object of the invention to switch a parallel image or pattern of electromagnetic energy, such as light as an array of photonic signals switched in parallel as a single photonic data signal. It is also an object of the invention to provide a photonic switch for switching serialized packets of photonic data embodied in electromagnetic radiation (e.g. visible light, laser light, infrared, etc). It is a further object of the invention to provide packetized addressing integrated within a packet in order to switch a photonic signal in a photonic switch, based upon an address portion of the photonic signal itself. Accordingly, it is an object of the invention to provide a switch mechanism capable of reading, in real time, an address portion of a photonic data packet, and switching a photonic data packet in accordance with the address therein.

Consistent with the foregoing objects, and in accordance with the invention as embodied and broadly described herein, an apparatus and method are disclosed, in suitable detail to enable one of ordinary skill in the art to make and use the invention. In certain embodiments an apparatus and method in accordance with the present invention may provide a versatile means and method of high speed switching of complete photonic wavefronts and waveforms, and routing them based on information contained within them. A photonic signal may have a complete wavefront made up of instantaneous spatial relations along with the time-varying nature of waveforms. This signal may be as simple as a photonic beam as would be emitted from an optical fiber, and/or directed by lenses or other optical elements having a simple binary modulated gausian cross section beam. Being transparent to the data signal, an apparatus in accordance with the present invention is also able to switch a complex photonic signal having both time and spatial-varying relationships. An example would be the series of images as in a motion picture, or a series of dynamic images common to photonic transistors. (See U.S. Pat. No. 5,093,802).

In the case of the simple telecommunications signal, the present invention maintains the spatial relationships of the beam profile so the switched output signal can be easily interfaced with down-stream components including other switches in a complex switching matrix.

Signals traversing optical fibers typically have polarization fluctuations. The present invention provides polarization insensitive transparent switching and routing even though the basic switching elements may require polarized energy. Such switching functions include addressable packet switching and other routing techniques.

In the case of more complex images, the entire spatial relationships that make up the image can be focused through the present invention as a complete image so that an image or a series of images can be automatically focused into one output location or another. Thus, the present invention can be used to switch extremely high volumes of parallel information as represented by the many pixels which make up each instantaneous image.

The basic method of the present invention for accomplishing photonic signal switching is comprised of the following steps:

1) A photonic signal is directed into a first polarization separating means to provide first and second polarized signals having complementary amplitudes and polarizations orthogonal to each other.

2) Directing the first polarized signal through a first switching means controlled by a direction control signal, to provide a first switched signal.

3) Directing said second polarized signal through a second switching means, also controlled by that same direction control signal, to provide a third switched signal, and 4) Then combining those first and third switched signals to provide a first output.

At this stage, the signal can be switched on and off. To produce the equivalent of an optical single pole double throw switch, a second switched signal from the first switching means and a fourth switched signal from the second switching means are combined to provide a second output.

The result is a switch that is substantially transparent to amplitude, frequency, phase and polarization variations of the photonic signal input. What's more, by selecting components that are able to maintain beam quality, and spatial relationships, full images may be switched.

There are many uses for high speed information switching. The performance of such devices often depends on beam quality. In order to reduce noise, and increase throughput, all aspects of a photonic signal, or group of signals must be reproduced accurately in the outputs. By maintaining phase and spatial relationships through the switch, entire complex images may be switched even through complex networks and switching matrices.

First of all, the photonic signal input is polarization separated into two paths. Even a common polarization beam splitter will separate, not just beams, but whole images having mutually orthogonal polarizations. Since the image can be considered as being made up of pixels, then two images are produced having matching pixel pairs (one in each image). These pixel pairs will have complementary amplitudes that depend upon the polarization of the original pixel.

The first polarized signal (image and all) is then photonically switched to produce first and second switched signals. The second polarized signal (image and all) is then photonically switched to produce third and fourth switched signals. The first and third switched signals are combined to produce a first output, and the second and fourth signals are combined to produce a second output.

The key to providing true transparency, is that the delay paths from polarization separation at the input to reunification at each output must be substantially the same. The switched signals must be aligned during the combining step so that matching pixel pairs are reunited so as to reproduce the original amplitude, frequency, phase, and polarizations of the original input signal. This reunification can be accomplished using a common polarization beam splitter.

In a free-space embodiment, the various signals can be collimated, or a variety of lenses can be used in order to properly direct the energy through the various components. Such transparency can be used to switch complex images, to maintain beam quality through a complex matrix of switches, and/or to switch parallel multiple beams.

Energy in these two paths will have complementary amplitude fluctuations in accordance with polarization fluctuations of each pixel of the photonic input signal, but their polarizations remain orthogonal to each other. This allows these signals to be switched using a pair of switches even though they may be polarization sensitive. The signals in each path are then switched simultaneously using any of a variety of switching means, include polarization rotating switches. This produces a pair of complementary switched signals, one from each switch, that are then combined to produce a first output. A second pair of complementary switched signals, one from each switch, are then combined to produce a second output.

The switched signal pairs are recombined having the same polarization, then any input polarization changes will be stabilized. If these signal pairs are recombined having orthogonal polarizations then the original polarization fluctuations will be preserved.

Any number of input channels, any number of output channels, and any organization of duplicate network switching means can be used. Each input is separated into its polarization components before being directed into a simultaneously controlled pair of switching configurations that produce the polarization component pairs that are then recombined to provide each output channel.

Switching means can include Kerr, Pockels, Faraday, birefringent, polymer and all optical polarization rotators or any other convenient means for rotating the polarization. Polarization separating means then provide the switched signals that are then recombined.

The present invention can be used as an optical signal router that is compatible with polarization modulation techniques. It can be made very broad band so that it can switch all the channels in an entire WDM system at the same time.

Switch control can be through various methods. One way is to decode the address part of a packet to control switching routes, thereby making a packet switching router. Generally such an address is located at the front of the packet. Decoding that address produces a direction control pulse that can then be stretched so that the switches remain directed along one route for the duration of the packet in the case of binary modulated photonic signals.

Spatial modulation addressing can also be used by sampling the input photonic signal and triggering switching action based on the parallel information in the individual images. Thus the present invention can be used to sort high speed images based on their content.

Computer controlled routers can also be constructed by controlling the switches with a computer. Full photonic control can be included by using photonically-controlled switches.

The foregoing objects and benefits of the present invention will become clearer through an examination of the drawings, description of the drawings, description of the preferred embodiment, and claims which follow.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 4 through 7, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain presently preferred embodiments consistent with the invention as claimed.

Figure 1:
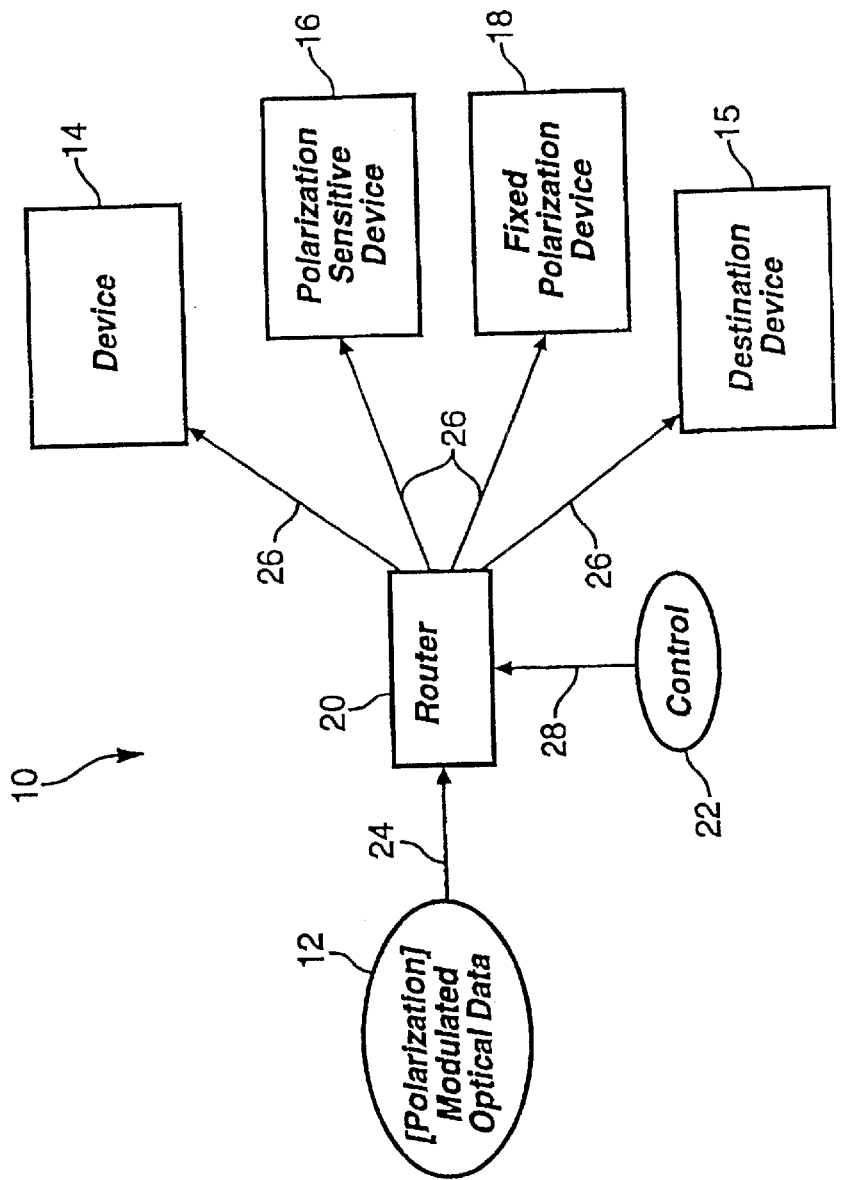
FIG. 1 is a schematic block diagram of an apparatus in accordance with the invention for switching a modulated optical data signal through a router toward a destination device.

Referring to FIG. 1, an apparatus 10 or system 10 for switching photonic signals among several possible destination devices can route data 12, particularly modulated data embodied in optical signals toward devices 14 capable of operating on the data 12. In selected embodiments, the devices 14 (generally) may include various polarization sensitive devices 16, or fixed polarization devices 18. A polarization sensitive device is one that may change its performance characteristics according to the polarization of an optical (photonic) signal received therein. A fixed polarization device, may require a specific polarization of the photonic signal received thereby. For example, a polarization sensitive device 16 may actually be a system for receiving and decoding a polarization-modulated signal. By contrast, a fixed polarization device 18 may be a device that receives a carrier signal modulated in phase, amplitude, or the like, on a carrier having a specific polarization required by the device 18.

Meanwhile, the devices 14 may be intermediate devices, additional switches in series, or the like. In some embodiments, a device 14 may be a destination device 15, that terminates the data transmission, and provides an output or other actuation or event desired.

In one present embodiment, a router 20 may receive from a control apparatus, and from an input path 24 or beam 24 signals for directing beams 26 or signals 26 along output paths 26 to various devices 14. In general, a control path 28 may be an electronic, electro-optical, optical, or photonic path. A router 20 may be fully photonic. Alternatively, a router 20 may be embodied in an electro-optical embodiment relying on electronic controls 22 for switching a modulated optical data signal 12. In certain embodiments, a polarization modulated optical data signal 12 may be received through the path 24, or as the beam 24, to be processed by the router 20.

One advantage of a router 20 is the extreme speed at which a signal 24 or beam 24 may be processed. In certain embodiments, a router 20 may actually receive photonic data 12 modulated as serialized data packets. Accordingly, due to the speeds corresponding to light waves, at which the data may be processed, the router 20 may read addressing data directly from a photonic data packet, in order to direct that particular packet toward a selected device 14. Other photonic data packets may be serialized data packets, operating similarly to classical electronic data packeting. Alternatively, the signals 24 or optical data 12 may be configured as photonic images. A photonic image is a two dimensional image that may be modulated in time. However, the two dimensional image may contain an array of pixels maintained in a coherent pattern in order to transmit, and thus route in the router 20 massive amounts of information in a parallel fashion.

Referring to the control 22 may actually be a selectable device external to the router 20. Alternatively, the control 22 may be a feedback mechanism based on the data 12 and resulting beam 24 carrying the data 12 to the router 20. Thus, the control 22 may be a feed-forward mechanism receiving data from the beam 24.

Figure 2:
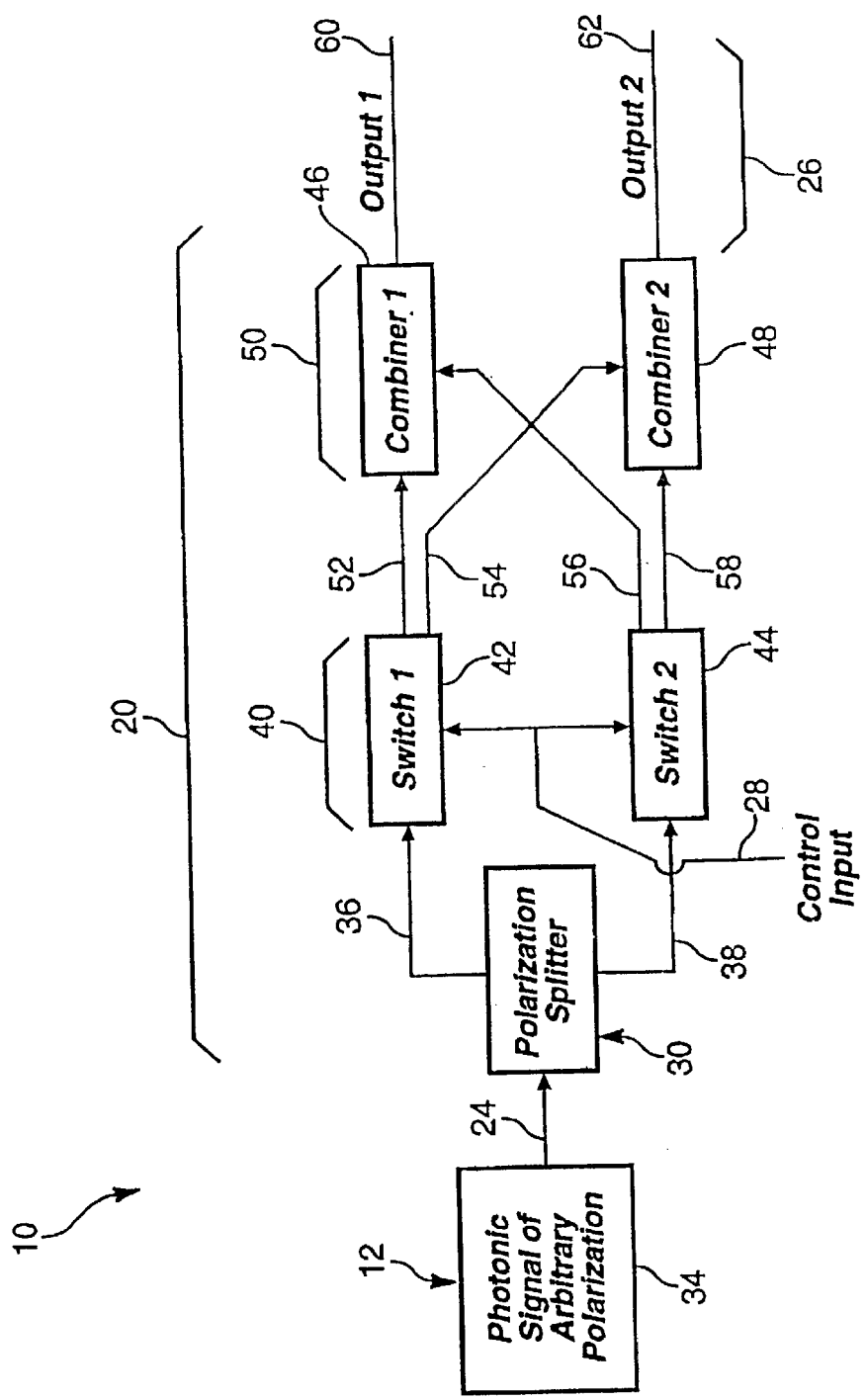
FIG. 2 is a schematic block diagram of the details internal to one embodiment of a router in accordance with FIG. 1.
Figure 3:
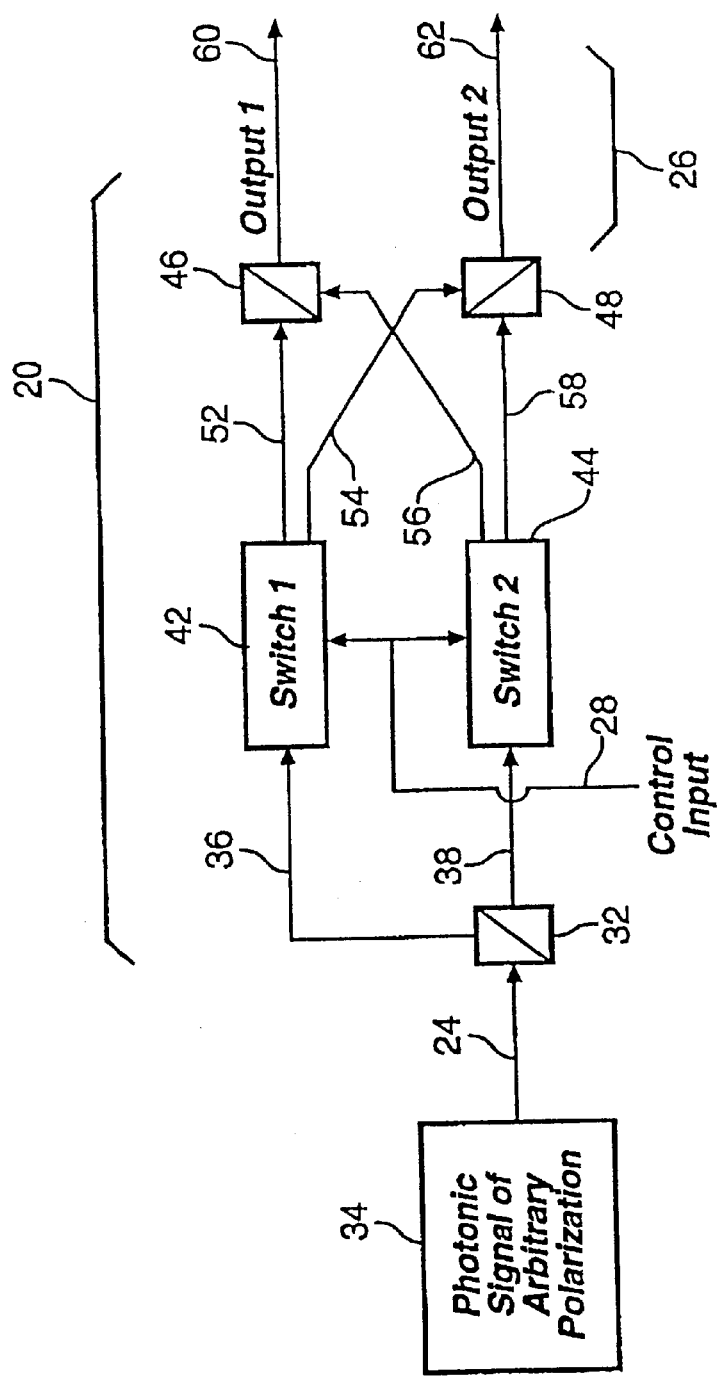
FIG. 3 is a schematic block diagram of one alternative embodiment of selected details of the switch of the apparatus of FIG. 2, particularly illustrating selected use of beam splitters as separators and combiners.

Referring to FIGS. 2–3, while continuing to refer generally to FIGS. 1–7, an apparatus 10 may include a router portion 20 relying on a beam splitter 30, which may be, in certain embodiments, a polarization splitter 32. In circumstances for which a router 20 is desired to preserve polarization, stabilize polarization to some pre-determined polarization state, or maintain coherence in a coherent, photonic image, the beam splitter 30 is preferably a polarization splitter 32.

The splitter 30 receives a beam 24 representing or containing a photonic signal 34 of arbitrary polarization. The splitter 30 then splits the incoming beam 24 into outgoing beams 36,38. Outgoing beams 36,38 are mutually orthogonal with respect to their relative states of polarization. The signals 36,38 may be thought of as beams 36,38, or alternatively, paths 36, 38. Thus, in the illustration the reference numerals 36, 38 represent the signals, beams, paths, 36, 38, respectively.

In general, switches 40 receive respective, orthogonal, polarized, photonic signals 36, 38, respectively. The switch 42 receives the photonic signal 36, while the switch 44 receives the photonic signal 38. The destination from the switches 40 for the data embodied in the signals 36, 38 is the combiners 46, 48, respectively. In general, a combiner 50 has the performance capability to combine two signals having mutually orthogonal states of polarization into a single, combined signal. Accordingly, a beam 52 or switched output 52 from a switch 42 has a specific polarization state as it arrives at the combiner 46. Accordingly, a signal 54, beam 54, or switched output 54 sent by the switch 42 toward the combiner 48 also has a state of polarization. In certain embodiments, the switched outputs 52, 54 may actually both have the same state of polarization. In other embodiments, the states of polarization of the switched outputs 52, 54 may be orthogonal to one another. Accordingly, the switch 42 is responsible to direct each of the beams 52, 54 toward the appropriate combiner 46, 48, respectively, and in the correct state of polarization. In selected embodiments, switches 42 may be selected having a capacity to alter the state of polarization of either the switched output 52, or the switched output 54, or both. Similarly, the switch 44 is responsible for directing the switched outputs 56, 58 or beams 56, 58 to the respective combiners 46, 48. Likewise, the switch 44 may, in selected embodiments, affect the state of polarization of either one or both of the switched outputs 56, 58.

However, in one presently preferred embodiment, each of the switches 42, 44 is a non-polarization-rotating switch 42, 44. Accordingly, each of the signals 36, 38 is directed only by the respective switches 42, 44, and the state of polarization thereof, is not changed. In this embodiment, each of the signals 36, 52, 54 has the same state of polarization. Similarly, in such an embodiment, each of the signals 38, 56, 58, has the same state of polarization.

The switches 42, 44 may be mechanical switches, electromechanical switches, electro-optical switches, magneto-optical switches, photonic switches, Kerr cells, and Mach-Zehnder interferometers. In reality, the Mach-Zehnder interferometer process may be used to configure a Mach-Zehnder switch. Optional elements for the switches 42, 44 that may alter the state of polarization of the incoming signals 36, 38 may include any polarization rotating switch, including Kerr cells, and the like.

Combiners 50 are sometimes referred to as beam splitters, in selected embodiments. That is, a beam splitter, may be operated in reverse. Accordingly, each combiner 46, 48 may be configured to be a polarization beam splitter. Accordingly, each of the combiners 46, 48 then maintains the proper construction of the respective input sets 52, 56, or 54, 58, respectively. That is, an input set 52, 56 or set of beams 52, 56 entering the combiner 46 have orthogonal states of polarization. When combined, the beams 52, 56 are reconstructed by the combiner 46 into a single output beam 60 which is complete, and contains the same state of polarization as the incoming beam 24, thus, the output 60 is a reconstituted version of the input beam 24, directed to path 60 or output path 60 as an output 60 therethrough. Similarly, the combiner 48 is preferably a polarization combiner. Accordingly, the signals 54, 58 (photonic signals, beams, switched outputs 54, 58) are combined by the combiner 48 into a reconstituted beam 62 or output 62 having the same state of polarization as the input beam 24.

However, in certain embodiments, particularly those in which the switches 42, 44 are polarization rotating switches, or the like, the output 60 has a state of polarization preserved to be the same as that of the input signal 24. By contrast, the output signal 62 does not have the preserved state of polarization equivalent to the input beam 24, but is a negative or rotated output that results when preservation and an output to the output path 60 is not desired. Negative has no significance other than meaning that an output routed to the path 60 may be regarded as a positive output or first output, while an output 62 routed to the path 62 represents an alternative switched output, in contrast the original output 60.

Referring to FIG. 3, while continuing to refer generally to FIGS. 1–7, a router 20 may includes a polarization splitter 32 embodied as a beam splitter 32. The beam splitter 32 in one presently preferred embodiment is a polarization beam splitter 32. Several alternative methods for manufacturing or fabricating polarization beam splitters 32 are known in the art. Accordingly, the polarization beam splitter 32 splits the signal 24 between two orthogonal components 36,38. The components 36,38 are complementary. That is, one may have more energy than the other. Nevertheless, the total energy represented by the amplitudes of the two component signals 36, 38 added together, substantially equals the energy of the incoming beam 24.

Figure 4:
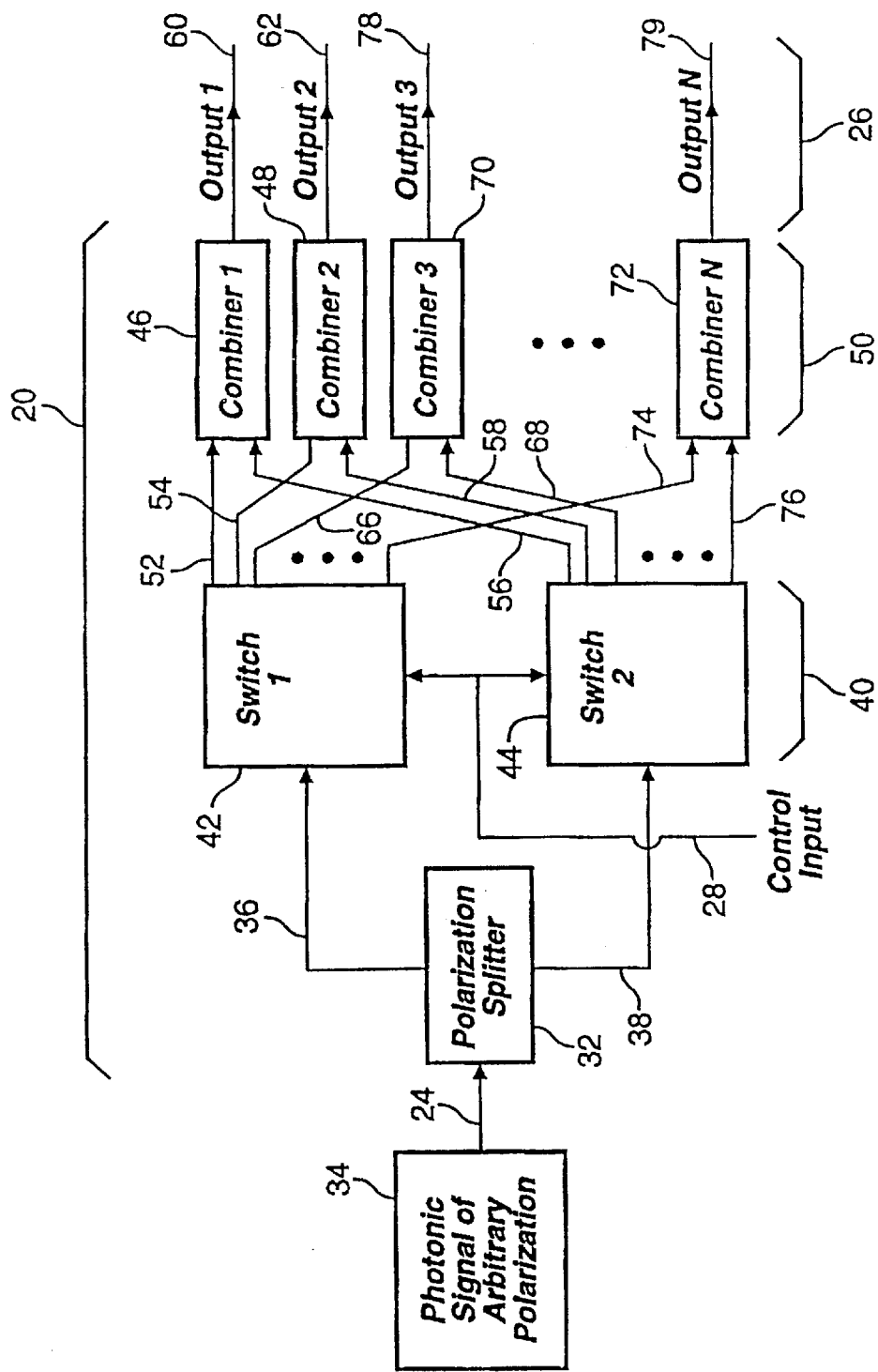
FIG. 4 is a schematic block diagram of one embodiment of a ganged series of outputs available to be routed to various combiners from a matched pair of multi-channel switches, in order to effect a selection from one of a plurality of outputs.

Meanwhile, the combiners 46, 48 can also be polarization beam splitters. Accordingly, the signals 52, 56 are orthogonal to one another. Similarly, the switched signals 54, 58 are orthogonal to one another. Thus, each respective beam splitter 46, 48 may be operated in reverse to combine the orthogonal signals 52, 56 and 54, 58, respectively. Thus, each combiner 46, 48 produces a respective output 60, 62 representing the full energy of the incoming beam 24, switched to the appropriate output direction 60, 62, and maintaining the state of polarization on the incoming beam 24. Referring to FIG. 4, while continuing to refer generally to FIGS. 1–7, an apparatus 10 may include a router 20 having switches 42, 44 that accommodate multiple outputs each from a single, respective input signal 36, 38. Thus, for example, the control input signal 28 may switch both of the switches 42, 44 simultaneously. Accordingly, the switch 42 and the switch 44 may switch respectively, the incoming signals 36, 38 between, respectively an input 52 into the combiner 46 and an input 56 into the combiner 46. Similarly, the control input signal 28 may switch the switches 42, 44 to route or switch the inputs 36, 38, respectively, to the output signal 54 to the combiner 48, and the output signal 58 to the combiner 48, respectively. Meanwhile, however, each switch 42, 44 may have multiple outputs 52, 56 in any number designed into the apparatus 10. Thus, the switched output signals 66, 68 are directed, respectively, from the switches 42, 44 toward the combiner 70. Meanwhile, some number of outputs, up to an output 74 from the switch 42, and an output 76 from the switch 44, may be directed, simultaneously, to the combiner 72.

Corresponding to each of the respective combiners at 46, 48, 70, 72 is an output 60, 62, 78, 79 respectively. In order to route the signal 24 to any of the respective outputs 60, 62, 78, 79 the switches 42, 44 merely direct respective orthogonal switched outputs.

Each of the switched outputs 52, 54 66, 74 is orthogonal to each of the switched outputs 56, 58, 68, 76. Accordingly, each of the combiners 46, 48, 70, 72 reconstitutes the signal 24 in the respective output 60, 62, 78, 79.

Figure 5:
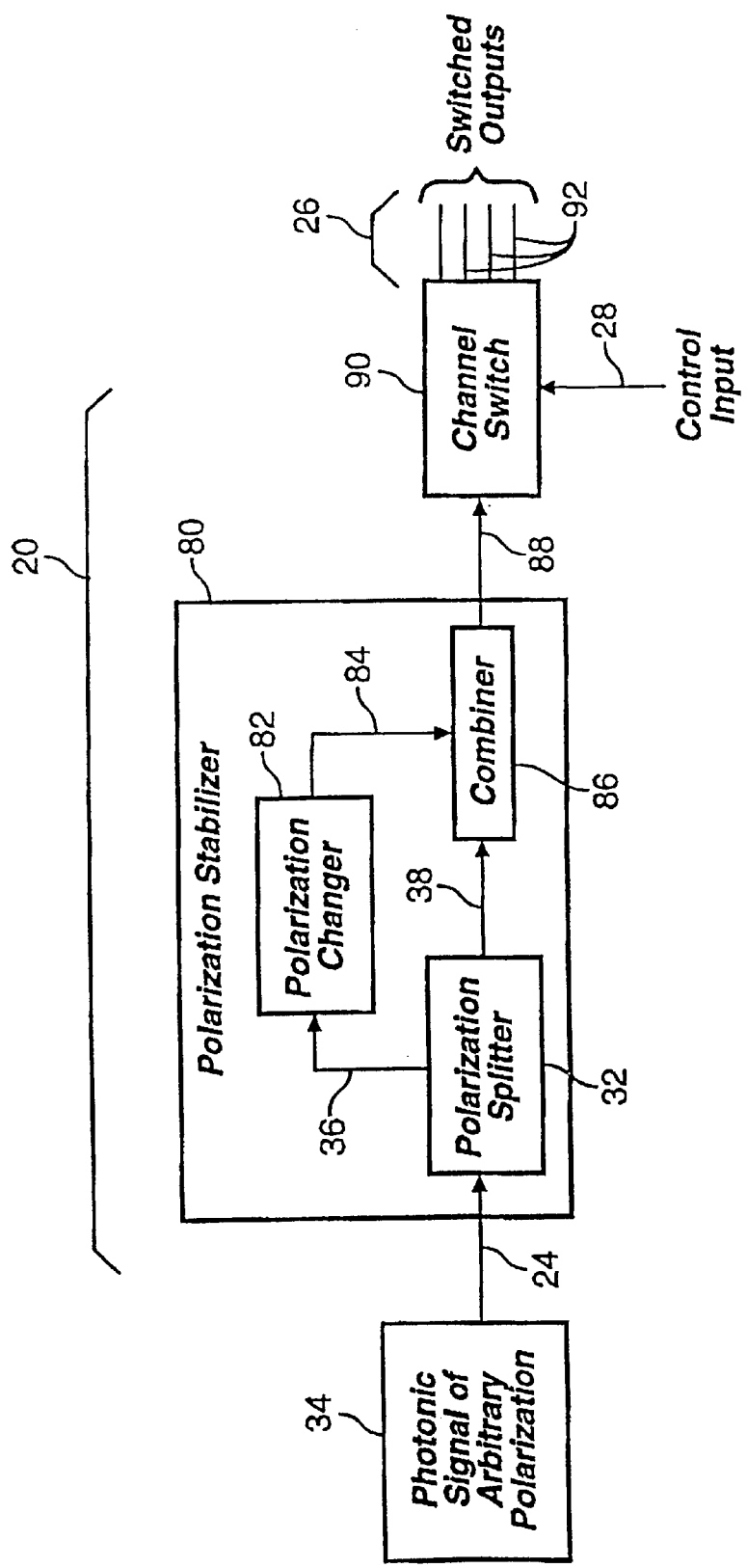
FIG. 5 is a schematic block diagram of an alternative embodiment of an apparatus in accordance with the invention featuring polarization stabilization of a switched output signal, regardless of the state of polarization of the input signal.

Referring to FIG. 5, while continuing to refer generally to FIGS. 1–7, an apparatus 10 may include a router 20 relying on a polarization stabilizer 80. In one presently preferred embodiment, the polarization stabilizer 80 may receive a signal 24, a photonic signal of arbitrary polarization 34 represented by a beam 24 or a path 24 received into a polarization splitter 32. In general, a splitter 30 may be used. However, in order to provide two orthogonal states of polarization in the respective constituent beams 36, 38, a polarization splitter 32 is required. The polarized beam 36 or signal 36 travels to a polarization changer 82. The polarization changer 82 alters the state of polarization of the output beam 84 to an orthogonal value with respect to the received beam 36 from the polarization splitter 32. The beams 36,38 are orthogonal. Thus, they may be positioned at 90 or 270 degrees with respect to one another. Similarly, the beams 36, 84 may be at 90 or 270 degrees with respect to one another.

As a practical matter, a 270 degree change may provide certain difficulties. However, a positive or negative 90 degrees may be regarded as equivalent in some certain instances, but not all. Accordingly, a simple 90 degree change in polarization between the beam 36 and the beam 84 entering and exiting, respectively, the polarization changer 82 into identical states of polarization. Thus, the combiner 50, embodied here as a non-polarizing combiner 86 combines two beams 38, 84 having the identical states of polarization. Two types of combiners 50 that may be suitable to serve as nono-polarization rotating combiners 86 may be amplitude combiners, and wave front combiners. One that can't be expected to work is a polarization beam splitter.

The combiner 86 produces an output 88. The output 88 is a combined output 88. However, the output 88 may also be referred to as a linearly polarized output 88, or an output 88 having a stabilized state of polarization. That is, the photonic signal 34 having an arbitrary state of polarization, is received by the polarization splitter 32 via the path 24, or the beam 24 having that arbitrary state of polarization. Nevertheless, after orthogonalization or splitting into orthogonal beams 36, 38, the signal 24 has been reconstituted at the combined output 88 only as reconstituted equivalent energy. The state of polarization has been changed to a predetermined state of polarization as dictated by the polarization splitter 32, the polarization changer 82, and the combiner 86 working in concert. One significant design or engineering concern in designing a polarization changer 82 and a combiner 86 is to provide equivalent path lengths for the signals 36, 84 (including passage through polarization changer 82) and correspondingly the path 38. Otherwise, shifts in phase may occur, degrading or even destroying the phase stabilization and even the energy of the stabilized output 88. That is, destructive interference may occur due to substantial shifts in phase at the combiner 86. Thus, the energy intended for the stabilized output 88 may be diverted by the combiner 86 to some other path.

The channel switch 90 receives the stabilized output 88. The channel switch 90 converts or directs the stabilized signal 88 among one of several stabilized, switched outputs 92. In general, the outputs 92 are similar to any output 26 from the apparatus 10. Nevertheless, the switched output 92 have been stabilized in phase due to the nature of the incoming signal 88 into the channel switch 90. The control input 28 in the apparatus of FIG. 5 controls switching of the channel switch 90 among the plurality of switched output paths 92.

Figure 6:
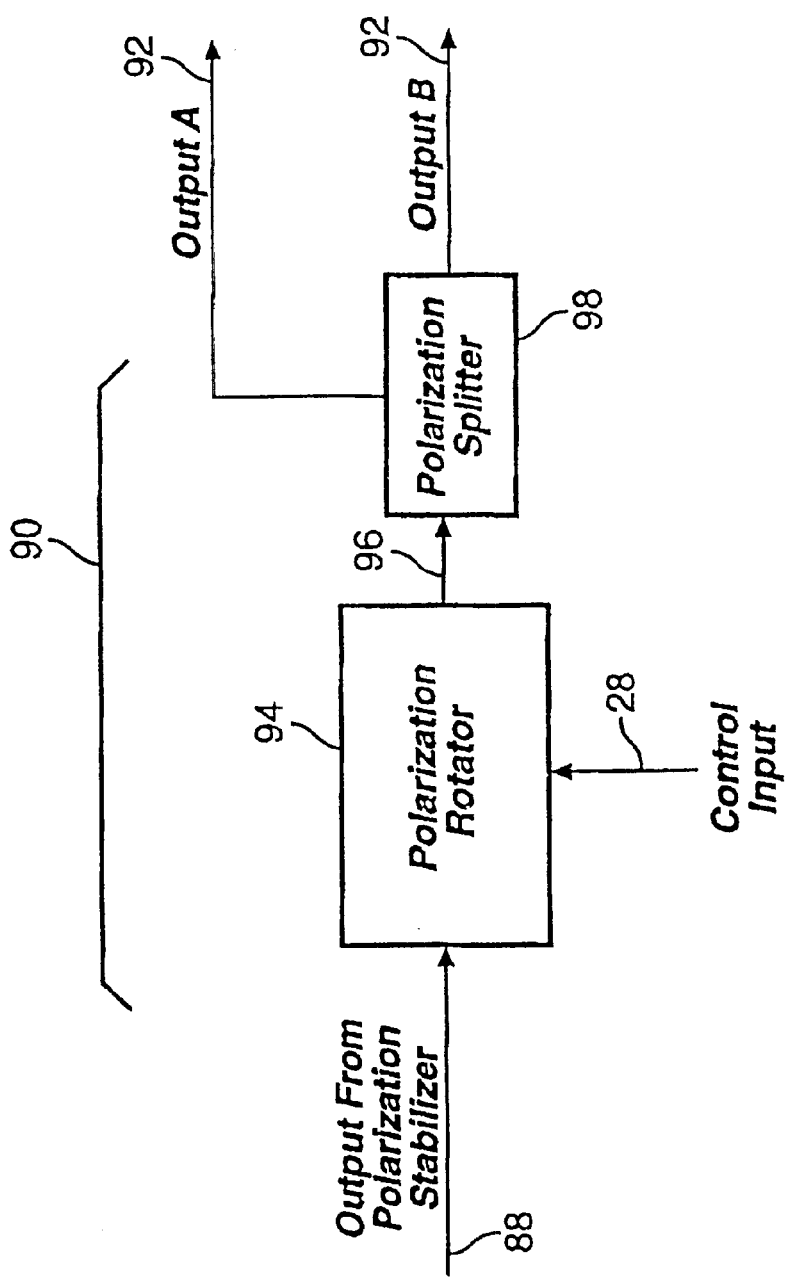
FIG. 6 is a schematic block diagram of one embodiment of a channel switch of FIG. 5, implemented in photonic components, including polarization rotation as a mechanism for switching.

Referring now to FIG. 6, while continuing to refer generally to FIGS. 1–7, a switch 90 may receive the output 88 from the polarization stabilizer 80. In one embodiment, the switch 90 or channel switch 90 may include a polarization rotator 94 controlled by the control input 28. The control input 28 has the effect of reorienting the state of polarization of the stabilized signal 88. The polarization rotator 94 rotates an output 96 to position it orthogonally with respect to the state of polarization of the signal 88. The combination of the polarization rotator 94 followed by a polarization beam splitter 98, results in an overall switch 90. The polarization splitter 98 operates to produce two orthogonal beams 92a, 92b inasmuch as the control input 28 causes a selective change in the state of polarization of the beam 96 or signal 96 output from the polarization rotator 94, an alignment of the state of polarization of the signal 96 in each of two selective positions, results in a filter effect by the polarization splitter 98. Accordingly, one state of polarization of the signal 96 results in a residual output 92a, and no output 92b. By contrast, the alternative state of polarization of the signal 96, when passed through a polarization splitter 98 filters out the constituent that would have been the output 92a, leaving only the residual output 92b. Thus, the control input 28 in combination with the polarization rotator 94 and polarization splitter 98 effects a switching of the energy of the signal 88 between two output 92a, and 92b.

The energy level of each of the outputs 92a, 92b is effectively total in their respective use. That is, the energy of the signal 88 is the virtual total energy originating from the signal 24. Similarly, the rotated and stabilized signal 96 is stabilized as the signal 88 was. However, the splitter 98, since the signal 96 is of a single state of polarization, effectively passes through the output 92b if the state of polarization of the beam 96 is the same as the state of polarization of the output beam 92b. However, the polarization splitter 98 reflects the incoming beam 96 to the output 92a if the state of polarization of the input beam 96 to the polarization splitter 98 is different from the state of polarization of the output path 92b.Thus, in such an event, the reflection from the polarization splitter 98 corresponds to a state of polarization of the beam 96 corresponding to the state of polarization of the path 92a and signal 92a output from the polarization splitter 98. If the state of polarization of the signal 96 is a first polarization, then the polarization splitter 98 passes the signal 98 to the output 92b. If the state of polarization of the signal 96 is the alternative state of polarization, then the polarization splitter 98 passes the beam 96 or signal 96 to the output 92a. As a practical matter, the illustration of FIG. 6, the orientation of the outputs 92a, 92b indicates that the output 92b passes through directly, while the output 92a is reflected. This orientation is arbitrary and may be reversed at will, according to the orientation of the polarization splitter 98. Meanwhile, the state of polarization of the output 92a is orthogonal to the state of polarization of the output 92b, both of which are stabilized to those specific states of polarization. Therefore, the control input 28 by changing the polarization of the beam 96 effectively switches between the outputs 92a, 92b accordingly to the orientation of the polarization splitter 98.

Figure 7:
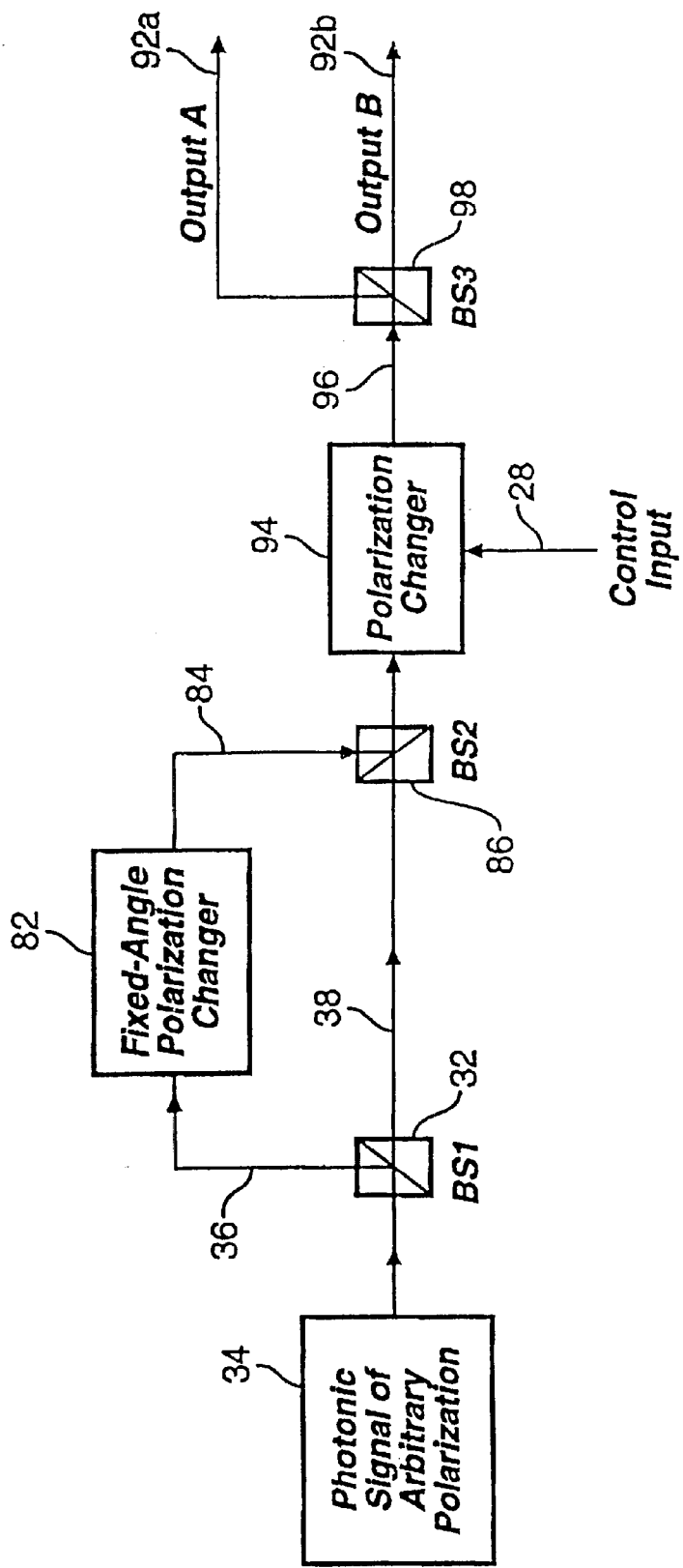
FIG. 7 is a schematic block diagram of a polarization stabilizer suitable for use in the apparatus of FIG. 5, and illustrating additional details of polarization stabilization by use of beam splitters as separators and combiners, in combination with polarization rotating elements.

Referring to FIG. 7, while continuing to refer generally to FIGS. 1–7, certain nuances or alternative embodiments of an apparatus 10 illustrate election of certain components. For example, one of the polarization splitter 32 may be a polarization beam splitter. For example, a conventional polarization beam splitter capable of passing two complimentary beams 36, 38 each having a state of polarization orthogonal to the other can serve the function of the polarization splitter 32. The polarization changer 82 may be served by a half-wave plate. A half-wave plate may act passively to rotate the beam 84 exiting from the incoming beam 36.

In contrast to the polarization beam splitter 32, the combiner 86 may be a beam splitter but cannot be a polarization beam splitter. That is, because the combiner 86 is combining two beams 84, 38, both having the same state of polarization, a polarization beam splitter would send either one signal or the other forward to the polarization rotator 94. In the embodiment on FIG. 7, the beam splitter 86, operating as a combiner 86 is responsible to pass, simultaneously, both beams 38, 84. Accordingly, the energy of the stabilized beam 88 has the total energy on the beam 24, less, of course, any incidental losses of transmission.

In the illustration of FIG. 7, the polarization splitter 98 may be a polarization beam splitter 98. Accordingly, the beam splitter 98 provides passage of a signal 96, to respective outputs 92a, 92b in accordance with the state of polarization of the input 96 from the polarization rotator switch 94. Accordingly, the control input 28 should the state of polarization of the signal 96, thus changing the ultimate destination or output 92a, 92b, through the polarization beam splitter 98. Thus, a polarization beam splitter 32 is required, a non-polarization beam splitter 86 is required, and a polarization beam splitter 98 is required to effect the embodiment on an apparatus 10 illustrated in FIG. 7.

An apparatus in accordance with the present invention may be relied upon to provide polarization insensitive cross-connects, smart routers, dumb routers, and so forth in any degree of cascading complexity. By use of duplicate switching, one switch for each state of polarization, and by recombination of energy in appropriate output pairs, signals can be routed in any combination imaginable. A matrix of switches may be substituted for the single-pole, --throw illustrations simplified to illustrate the basic concept. Thus, multiple switched signals, combine to make multiple component outputs, are contemplated in accordance with the invention as disclosed herein.

As a result, an apparatus and method in accordance with the present invention can produce an exclusively photonic router, cross connect, switching matrix, of many types. Such may also provide routers having exclusively photonic transmission paths with electronic, electro-mechanical, electro-optical, or other types of switching control. Within contemplation, an apparatus and method in accordance with the invention may provide polarization insensitive switching of wave-division-multiplexed or amplitude-modulated and even phase-modulated signals. Similarly, such an apparatus may provide routing of frequency-modulated signals, microwave signals, and spread spectrum signals. In one embodiment, an apparatus in accordance with the invention need not be digital. Analog signals and other complex signal forms are appropriate in an apparatus and method in accordance with the invention. Addressing information and controlling addressing can result from any convenient means suitable for directing a switched signal.

In one embodiment, a network of switches may be connected together in order to provide different transmission channels carrying addressing information. Alternatively, addressing information may be encoded in analog form. Switches may be simply constructed in ways that are appropriate to a particular routing method desired or implemented.

Since each pixel of an image can be made to reflect a separate data channel, simply by modulation, in all independently modulated channels may be operated on in parallel so far as switching is concerned. In one embodiment of an apparatus in accordance with the present invention, massive bandwidth, parallel routing, and extremely high speeds, the speed of light, and the frequencies of the spectrum of light, are reasonable.

In certain embodiments, an apparatus and method in accordance with the invention may provide many versatile devices for creating photonic networks, switching all types of information that may be embodied in photonic signals, in any suitable format, without requiring any special treatment in order to accommodate any conceivable polarization fluctuations. Thus, even polarization modulation may be transmitted through an apparatus 10 in accordance with the invention. Wide area networks, local area networks, peripheral devices associated with computers, projectors, image switching systems, telecommunications systems, and fiber optic networks, are all within contemplation. From the above discussion, it will be appreciated that the present invention provides ultra high speed switching photonic signals, by fully-photonic control, or by other more conventional controls.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for routing photonic signals, the apparatus comprising:
   an input path configured to receive photonic data signals having a state of polarization;
   a plurality of output paths configured to receive the photonic data signals;
   a control path configured to receive a control signal for directing the photonic data signals among the plurality of output paths;
   a router, operably connected between the input path, plurality of output paths, and control path, and configured to route the input signal to an output path of the plurality of output paths, preserving the state of polarization wherein the router further comprises:
      a polarization splitter configured to receive the input signals from the input path and split the input signals into first and second orthogonal signals;
      a first switch operably connected to the polarization splitter to receive directly the first orthogonal signal and to output the first orthogonal signal;
      a second switch operably connected to the polarization splitter to receive directly the second orthogonal signal and to output the first orthogonal signal;
      wherein one of the first and second switches is non-rotating and the other of the first and second switches is rotating, with respect to the state of polarization, for providing, respectively, one output from the router with the state of polarization preserved and another output from the router with the state of polarization stabilized; and
      the control path, further connected to the first and second switches to control selection of a destination to receive the first and second orthogonal signals.

2. An apparatus for routing photonic signals, the apparatus comprising:
   an input path configured to receive photonic data signals having a state of polarization;
   a plurality of output paths configured to receive the photonic data signals;
   a control path configured to receive a control signal for directing the photonic data signals among the plurality of output paths;
   a router, operably connected between the input path, plurality of output paths, and control path, and configured to route the input signal to an output path of the plurality of output paths, preserving the state of polarization wherein the router further comprises:
      a polarization splitter configured to receive the input signals from the input path and split the input signals into first and second orthogonal signals;
      a first switch operably connected to the polarization splitter to receive directly the first orthogonal signal and to output the first orthogonal signal;
      a second switch operably connected to the polarization splitter to receive directly the second orthogonal signal and to output the first orthogonal signal;
      the control path, further connected to the first and second switches to control selection of a destination to receive the first and second orthogonal signals;
      a first combiner, operably connected to receive directly from the first and second switches the first and second orthogonal signals;
      a second combiner, operably connected to receive directly from the first and second switches the first and second orthogonal signals; and
      the first and second combiners, further configured to output the input signal, reconstituted to preserve the state of polarization and phase thereof, to a selected destination.

3. The apparatus of claim 2, wherein the photonic signal is modulated in a domain selected from polarization, amplitude, frequency, phase, and a combination of two or more thereof.

4. The apparatus of claim 3, wherein the control signal is selected from an electronic signal and a photonic signal.

5. The apparatus of claim 4, further comprising a plurality of input paths and a plurality of routers, the plurality of routers being ganged to direct the input signals received from the plurality of input paths among the output paths.

6. The apparatus of claim 5, wherein the plurality of routers is ganged in parallel.

7. The apparatus of claim 6, wherein the plurality of routers is also ganged in series.

8. The apparatus of claim 7, wherein the switches are non-rotating with respect to the state of polarization.

9. The apparatus of claim 8, wherein one of the first and second switches is non-rotating and the other of the first and second switches is rotating, with respect to the state of polarization, for providing, respectively, one output from the router with the state of polarization preserved and another output from the router with the state of polarization stabilized.

10. The apparatus of claim 8, wherein the photonic signal is polarization modulated.

11. The apparatus of claim 10, wherein the control signal is a photonic signal.

12. The apparatus of claim 8, wherein the first and second switches are rotating, with respect to the state of polarization, each of the first and second switches thereby providing one output with the state of polarization preserved and another output with the state of polarization rotated.

* * * * *